(12) United States Patent
Boissonnat et al.

(10) Patent No.: US 8,137,094 B2
(45) Date of Patent: Mar. 20, 2012

(54) METHOD AND DEVICE FOR PRODUCING A COMPOSITE YARN

(75) Inventors: Philippe Boissonnat, Challes-les Eaux (FR); Daniel Richard, Sainte Helene du lac (FR)

(73) Assignee: OCV Intellectual Capital, LLC, Toledo, OH (US)

( * ) Notice: Subject to any disclaimer, the term of this patent is extended or adjusted under 35 U.S.C. 154(b) by 74 days.

(21) Appl. No.: 12/266,592

(22) Filed: Nov. 7, 2008

(65) Prior Publication Data
US 2009/0126332 A1    May 21, 2009

Related U.S. Application Data

(62) Division of application No. 10/398,509, filed on Jul. 23, 2003, now Pat. No. 7,465,418.

(51) Int. Cl.
*D01D 13/02* (2006.01)

(52) U.S. Cl. ........... 425/382.2; 65/442; 65/486; 65/500; 65/529; 65/535; 264/211.12; 264/211.14; 425/377; 425/404; 425/445

(58) Field of Classification Search ............... 425/382.2, 425/377, 404, 445; 264/211.12, 211.14; 65/381, 442, 486, 500, 529, 535
See application file for complete search history.

(56) References Cited

U.S. PATENT DOCUMENTS

| | | | |
|---|---|---|---|
| 2,930,102 A | 3/1960 | Hitchin |
| 3,032,813 A | 5/1962 | Stalego |
| 3,072,518 A | 1/1963 | White |
| 3,091,018 A | 5/1963 | Rees |
| 3,134,704 A | 5/1964 | Modigliani |
| 3,269,818 A | 8/1966 | Tiede |
| 3,292,871 A | 12/1966 | Smith et al. |
| 3,844,497 A | 10/1974 | Harrill |
| 3,939,639 A | 2/1976 | Ellegast |
| 3,955,952 A | 5/1976 | Drummond |
| 4,230,284 A | 10/1980 | Cunningham |
| 4,342,579 A | 8/1982 | Sanders |
| 4,492,662 A | 1/1985 | Larrive |
| 4,762,750 A | 8/1988 | Girgis et al. |
| 4,774,042 A | 9/1988 | Schippers |

(Continued)

FOREIGN PATENT DOCUMENTS
BE    640075    5/1964
(Continued)

OTHER PUBLICATIONS
International Search Report and Written Opinion from PCT/FR05/50960 dated Apr. 7, 2006.
(Continued)

*Primary Examiner* — Matthew J Daniels
*Assistant Examiner* — Joseph Leyson
(74) *Attorney, Agent, or Firm* — Calfee, Halter & Griswold LLP

(57) ABSTRACT

A process for manufacturing a composite yarn including continuous glass filaments intermingled with continuous organic thermoplastic filaments and an apparatus for implementing the process. The continuous glass filaments come from a bushing and are separated into plural sheets. The continuous organic thermoplastic filaments come from a spinning head and are separated into plural sheets. The thermoplastic filaments are thrown into the glass filaments so as to mingle them, in a ratio of at least one sheet of thermoplastic filaments in each sheet of glass filaments, the mingled filaments then being gathered into at least one composite yarn.

10 Claims, 4 Drawing Sheets

U.S. PATENT DOCUMENTS

| | | | |
|---|---|---|---|
| 4,865,085 A | 9/1989 | Ghiardo | |
| 5,011,523 A | 4/1991 | Roncato et al. | |
| 5,156,347 A | 10/1992 | Gay | |
| 5,316,561 A | 5/1994 | Roncato | |
| 5,422,180 A | 6/1995 | Lukhard | |
| 5,425,796 A | 6/1995 | Loubinoux et al. | |
| 5,454,846 A | 10/1995 | Roncato et al. | |
| 5,558,825 A * | 9/1996 | Ueda et al. | 264/103 |
| 5,582,843 A | 12/1996 | Sellars | |
| 5,626,643 A | 5/1997 | Woodside et al. | |
| 5,744,089 A * | 4/1998 | Woodside et al. | 264/211.14 |
| 5,811,480 A | 9/1998 | Kirchmeyer et al. | |
| 6,025,073 A | 2/2000 | Piret | |
| 6,027,680 A | 2/2000 | Woodside et al. | |
| 6,074,590 A | 6/2000 | Gownder | |
| 6,109,066 A | 8/2000 | Loubinoux | |
| 6,190,768 B1 | 2/2001 | Turley et al. | |
| 6,270,897 B1 | 8/2001 | Flautt et al. | |
| 6,440,558 B2 | 8/2002 | Klaus et al. | |
| 6,482,400 B1 | 11/2002 | Collin | |
| 6,514,612 B1 | 2/2003 | Moireau et al. | |
| 7,465,418 B2 | 12/2008 | Boissonnat et al. | |
| 2002/0164192 A1 | 11/2002 | Gueret | |
| 2005/0060980 A1 | 3/2005 | Howell et al. | |
| 2006/0234028 A1 | 10/2006 | Pardo | |
| 2008/0299856 A1 | 12/2008 | Loubinoux et al. | |
| 2010/0230851 A1 | 9/2010 | Loubinoux et al. | |

FOREIGN PATENT DOCUMENTS

| | | |
|---|---|---|
| CN | 1479811 | 3/2004 |
| DE | 3617248 | 3/1987 |
| EP | 117415 | 9/1984 |
| EP | 199059 | 10/1986 |
| EP | 211748 | 2/1987 |
| EP | 299506 | 1/1989 |
| EP | 0 367 661 | 5/1990 |
| EP | 0 505 275 | 9/1992 |
| EP | 0 599 695 | 6/1994 |
| EP | 0 616 055 | 9/1994 |
| EP | 610147 | 9/1995 |
| FR | 1303213 | 9/1962 |
| FR | 2140443 | 1/1973 |
| FR | 2232620 | 2/1976 |
| FR | 2698038 | 5/1994 |
| JP | 55-016852 | 2/1980 |
| JP | 58-031111 | 2/1983 |
| JP | 58-041910 | 3/1983 |
| JP | 58-060032 | 4/1983 |
| JP | 2-70841 | 3/1990 |
| JP | 2-160907 | 6/1990 |
| JP | 02-243469 | 9/1990 |
| JP | 03 059038 | 3/1991 |
| JP | 3-270612 | 12/1991 |
| JP | 4-222246 | 8/1992 |
| JP | 5-207621 | 8/1993 |
| JP | 7-003558 | 1/1994 |
| JP | 6-220731 | 8/1994 |
| JP | 6-294795 | 10/1994 |
| JP | 7-096248 | 4/1995 |
| NO | 174635 | 4/1990 |
| NO | 175683 | 9/1992 |
| WO | WO 93/06055 | 4/1993 |
| WO | WO 96/10660 | 4/1996 |
| WO | WO 96/40596 | 12/1996 |
| WO | WO 97/10101 | 3/1997 |
| WO | WO 98/01751 | 1/1998 |
| WO | 98/18737 | 5/1998 |
| WO | WO 00/26155 | 5/2000 |
| WO | 02/31231 | 4/2002 |
| WO | 02/31235 | 4/2002 |
| WO | WO 02/28948 | 4/2002 |
| WO | 02/059055 | 8/2002 |
| WO | 03/093545 | 11/2003 |
| WO | 2006/054025 | 5/2006 |
| WO | 2007/113431 | 10/2007 |
| WO | 2007/116181 | 10/2007 |

OTHER PUBLICATIONS

International Search Report and Written Opinion from PCT/FR07/51067 dated Aug. 17, 2007.
International Search Report and Written Opinion from PCT/FRO7/50991 dated Sep. 17, 2007.
Office action from U.S. Appl. No. 11/719,455 dated Jun. 4, 2010.
Office action from U.S. Appl. No. 11/719,455 dated Dec. 8, 2010.
Communication from EP Application No. 97931851.6 dated Oct. 1, 2001.
Communication from EP Application No. 05819176.8 dated Mar. 19, 2010.
Communication from EP Application No. 07731870.7 dated Apr. 22, 2009.
Communication from EP Application No. 07731804.6 dated Feb. 19, 2009.
Communication from EP Application No. 07731804.6 dated Jun. 29, 2010.
Office action from U.S. Appl. No. 10/398,509 dated Jun. 29, 2005.
Office action from U.S. Appl. No. 10/398,509 dated Dec. 9, 2005.
Office action from U.S. Appl. No. 10/398,509 dated May 2, 2006.
Advisory Action from U.S. Appl. No. 10/398,509 dated Jul. 10, 2006.
Office action from U.S. Appl. No. 10/398,509 dated Dec. 12, 2006.
Office action from U.S. Appl. No. 10/398,509 dated May 22, 2007.
Office action from U.S. Appl. No. 10/398,509 dated Oct. 24, 2007.
Office action from U.S. Appl. No. 10/398,509 dated Jun. 4, 2008.
Notice of Allowance from U.S. Appl. No. 10/398,509 dated Aug. 11, 2008.
Office action from U.S. Appl. No. 12/294,965 dated Sep. 12, 2011.
Office action from Canadian Application No. 2,103,313 dated Jun. 9, 2003.
Office action from Canadian Application No. 2,425,222 dated Feb. 3, 2009.
Office action from Chinese Application No. 01820406.6 dated Jul. 18, 2006.
Office action from Chinese Application No. 01820406.6 dated Nov. 16, 2006.
Office action from Chinese Application No. 01820406.6 dated May 31, 2007.
Office action from Czech Republic Application No. 2490/93 dated May 20, 1997.
Communication from EP Application No. 01972213.1 dated Jan. 21, 2004.
Search Report from French Application No. 0651115 dated Dec. 11, 2006.
Search Report from French Application No. 00 12990 dated Jan. 10, 2003.
Office action from Hungarian Application No. 9303276 dated Mar. 18, 1997.
Office action from Hungarian Application No. 9303276 dated Apr. 6, 1998.
Office action from Indian Application No. 401/KOLNP/2003 dated Oct. 5, 2007.
Office action from Korean Application No. 10-2003-7004997 dated Apr. 17, 2007.
Office action from Mexican Application No. 93.07210 dated Jan. 26, 1998.
Office action from Slovakia Application No. PV 0317-98 dated Oct. 12, 2004.
Office action from Czech Republic Application No. PV 2490-93 date Nov. 1997.
Office action from Russian Application No. 2003113213 dated 2005.
International Preliminary Examination Report from PCT/FRO1/02979 dated Mar. 20, 2002.
International Search Report and Written Opinion from PCT/FR01/02979 dated Dec. 6, 2001.
International Preliminary Examination Report from PCT/FR/01/02979 dated Jan. 21, 2004.
Office action from U.S. Appl. No. 08/152,554 dated Jun. 1, 1994.
International Search Report and Written Opinion from PCT/FR97/01184 dated Nov. 28, 1997.
Office action from U.S. Appl. No. 08/152,554 dated Nov. 15, 1994.

Notice of Allowance from U.S. Appl. No. 08/152,554 dated Mar. 10, 1995.
Office action from U.S. Appl. No. 09/029,606 dated Jan. 24, 2000.
Notice of Allowance from U.S. Appl. No. 09/029,606 dated May 3, 2000.
Office action from Australian Application No. 50447/93 dated Aug. 2, 1995.
Office action from Australian Application No. 50447/93 dated Aug. 19, 1996.
Office action from Chinese Application No. 93114244.X dated Mar. 26, 1998.
Office action from Chinese Application No. 97191223.8 dated May 10, 2002.
Search Report from EP Application No. 93402783 dated Feb. 17, 1994.
Office action from Chinese Application No. 200580046779.X dated Sep. 4, 2009.
Search Report from FR Application No. 656,366 dated Jul. 4, 2005.
Search report from FR Application No. 678,022 dated Dec. 14, 2006.
Office action from Indian Application No. 697/Cal/93 dated Jul. 25, 1996.
Office action from Indian Application No. 1239/Cal/97 dated Mar. 3, 2003.
Office action from Indian Application No. 1239/Cal/97 dated Jan. 14, 2004.
Office action from Japanese Application No. 5-290935 dated May 8, 2001.
Office action from Japanese Application No. 10-504855 dated Feb. 7, 2006.
Office action from Japanese Application No. 10-504855 dated Sep. 19, 2006.
Office action from Japanese Application No. 2002-534596 dated Mar. 29, 2011.
Office action from Korean Application No. 10-1998-0701757 dated Feb. 2, 2005.
Office action from Norwegian Application No. P934036 dated Nov. 1, 1995.
Office action from Norwegian Application No. P934036 dated Jul. 30, 1996.
Office action from Norwegian Application No. 934036 dated Oct. 25, 1996.
Office action from Norwegian Application No. 934036 dated Jan. 31, 1997.
Office action from Norwegian Application No. 934036 dated Sep. 3, 1997.
Office action from Polish Application No. 301,085 dated Nov. 22, 1996.
Office action from Russian Application No. 98106476 dated Jun. 20, 2001.
Office action from Taiwanese Application No. 86116776 dated Dec. 22, 1998.
Anter Laboratories, Inc. Linear Thermal Expansion Data Sheet 1988.
Office action from Russian Application No. 2008138756 dated Oct. 7, 2011, and English-language summary of relevant portions thereof.
Office action from Russian Application No. 93051360 dated Dec. 20, 1997.
Office action from Chinese Application No. 200780018736.X dated Jan. 11, 2012.

* cited by examiner

METHOD AND DEVICE FOR PRODUCING A COMPOSITE YARN

CROSS-REFERENCE TO RELATED APPLICATIONS

The present application is a divisional application of U.S. patent application Ser. No. 10/398,509, now U.S. Pat. No. 7,465,418, filed Jul. 23, 2003, which is the U.S. counterpart of WO 02/31235, which in turn claims priority to French application no. 00/12990 filed on Oct. 11, 2000, of each of which the entire contents are incorporated herein by reference.

The invention relates to a process and to an apparatus for manufacturing a composite yarn comprising continuous glass filaments intermingled with continuous organic thermoplastic filaments.

Processes for producing a composite yarn comprising such glass and organic thermoplastic filaments are already known.

EP-A-0 367 661 describes a process employing a first installation comprising a bushing, from which continuous glass filaments are drawn, and a second installation comprising a spinning head, fed under pressure with an organic thermoplastic, which delivers continuous organic filaments. During assembly, the two types of filaments may be in the form of sheets, or of sheet and yarn. In the glass/thermoplastic composite yarn obtained, the thermoplastic filaments surround the glass filaments and preserve them from rubbing forces generated when said yarn comes into contact with solid surfaces. However, this arrangement does not allow perfectly homogeneous blending of the two types of filaments to be obtained: a cross section of the composite yarn shows separate regions of each type of filament.

Moreover this composite yarn has a tendency to undulate. Thus, when the yarn is wound in the form of packages, the shrinkage of the thermoplastic filaments produces an undulation over the entire periphery of the package. This phenomenon has drawbacks: it requires the use of thick sleeves for producing packages so that they resist the fretting exerted by the composite yarn on the one hand, and disturbs the unwinding of the package because the geometrical characteristics are not preserved, on the other hand.

EP-A-0 505 275 provides a process for producing a composite yarn similar to that described above in EP-A-0 367 661, which uses at least one spinning head normally used in the synthetic fiber industry. In this way, it is possible to obtain a composite yarn formed from one or more glass yarns surrounded by organic filaments, which composite yarn is independent of the configuration of the spinning head used to extrude the organic filaments.

This document recommends that the organic filaments be drawn as one or more sheets defining, partly or completely, a region of conical or pyramidal shape comprising an open sector via which the glass yarn is introduced. The composite yarn obtained has the same defects (nonhomogeneous distribution of the filaments and undulation) as the yarn described previously.

Document EP-A-0 599 695 describes the manufacture of a glass/thermoplastic composite yarn which consists in mingling a bundle or a sheet of continuous glass filaments coming from a bushing and a sheet of continuous thermoplastic filaments coming from a spinning head, at a rate during their penetration into the bundle or sheet of glass filaments which is greater than the drawing rate of the glass filaments. With this process, the thermoplastic filaments are overdrawn in order to compensate for their shrinkage, so that the composite yarn does not undulate during its formation and remains stable overtime.

EP-A-0 616 055 provides another process for producing a glass/thermoplastic composite yarn which consists in mingling a sheet of thermoplastic filaments with a bundle or sheet of glass filaments, the thermoplastic filaments being, upstream of the point of convergence, heated to a temperature above their conversion temperature, drawn and then cooled.

In particular for manufacturing cost reduction reasons, it is sought to increase the production capacity of industrial bushings by increasing the number of orifices, to reach 800 or even 1600 or 2400 orifices.

With the processes that have just been described, it may be difficult to produce, under the aforementioned conditions, a composite yarn in which the two types of filament are distributed homogeneously. This is because when the number of orifices of the bushing becomes large, it is found that the throwing of the sheet of thermoplastic filaments into the bundle or sheet of glass filaments is no longer regular, the thermoplastic filaments having a tendency to be distributed preferentially in the center of the bundle or sheet of glass filaments. Moreover, when the length of the bushing increases, the distances traveled by the glass filaments located at the center and by those at the ends of the bushing are no longer identical. This results in a deviation in the diameter of the filaments thus produced.

The problem posed by the quality of intermingling of the glass and thermoplastic filaments within a composite yarn using a large bushing (with more than 800 orifices) is solved by a process for manufacturing a composite yarn formed by intermingling continuous glass filaments coming from a bushing with continuous organic thermoplastic filaments coming from a spinning head, in which process the glass filaments are separated into several sheets, the thermoplastic filaments are separated into several sheets and the thermoplastic filaments are thrown into the glass filaments so as to mingle them, in a ratio of at least one sheet of thermoplastic filaments in each sheet of glass filaments, the mingled filaments then being gathered into at least one composite yarn.

The separation thus produced makes it possible to obtain excellent intermingling of the glass filaments and thermoplastic filaments, which results in a homogeneous and uniform distribution of said filaments, as shown by the composite yarn intermingling index and cross section, which are given below. According to a preferred embodiment of the invention, a single sheet of thermoplastic filaments is combined, by throwing, with each sheet of glass filaments.

By virtue of the invention, it is possible to form a single glass/thermoplastic composite yarn having a high linear density (mass per unit length of about 3000 g/km), or else several yarns of lower linear density, which may be wound up onto one or more sleeves carried by the same spindle of a winder.

Another advantage of the process according to the invention is the fact that it is possible to obtain the composite yarn directly from the molten constituent materials of the filaments, without passing through intermediate filament assembly and winding steps. This process should be distinguished from the processes described particularly in WO-A-96/10660, WO-A-97/10101 and WO-A-96/40596 which combine a sheet of glass filaments formed from a bushing containing the molten glass and of thermoplastic yarn(s) obtained by unwinding one or more packages.

Another advantage of the process according to the invention is that it makes it possible to form a composite yarn from thermoplastic filaments of different nature using the same spinning head. This manner of proceeding makes it possible in particular to avoid having to increase the number of spinning heads and therefore of not taking up a lot of space near the bushing.

The invention also provides an apparatus for implementing this process.

According to the invention, to allow the manufacture of a composite yarn formed from continuous glass filaments intermingled with continuous thermoplastic filaments, this apparatus comprises, on the one hand, an installation comprising at least one bushing, fed with molten glass, the lower face of which has a multitude of orifices, in general at least 800 orifices, this bushing being combined with a coater and with means for separating the glass filaments into several bundles or sheets, and, on the other hand, an installation comprising at least one spinning head fed under pressure with a molten organic thermoplastic, this spinning head being combined with means for separating the thermoplastic filaments into several sheets and being combined with a drawing device and with means for throwing said filaments for the purpose of mingling them with the glass filaments and, finally, means common to the two installations which allow at least one composite yarn to be assembled and wound up. The drawing device that can be used within the context of the invention may, for example, be of the type consisting of drums, described in WO-A-98/01751 or in EP-A-0 599 695, which may also include a heating means, as proposed in EP-A-0 616 055.

Preferably, the glass filaments are separated into as many sheets as there are sheets of thermoplastic filaments, each sheet of thermoplastic filaments being consequently thrown into a single sheet of glass filaments. Particularly advantageously, the sheets of thermoplastic filaments are identical, on the one hand, and the bundles or sheets of glass filaments are identical, on the other.

According to a preferred embodiment of the invention, the means for separating the glass filaments are placed in such a way that each sheet delimited by the coating roll and said means has the shape of an isosceles triangle into which the thermoplastic filaments are thrown. In this way, the distances traveled by the outer filaments are identical, thereby making it possible to reduce the dispersion in the diameter of the glass filaments.

The means allowing the glass filaments to be separated into several sheets may consist of spreading combs or grooved pulleys, these being stationary or moving, this means furthermore having the function of taking up the tensions in the winding device. This arrangement has two advantages. It allows the filaments to be separated into sheets and also allows the glass and thermoplastic filaments to be assembled for the purpose of forming the composite yarn(s). It is thus easily possible to obtain the desired geometry of each sheet by adjusting the distance between said separating means and the coating roll on the one hand, and the distance between these same means, on the other.

According to another preferred embodiment of the invention, the sheets of thermoplastic filaments pass over a common drawing device and each sheet is combined with the glass filaments by means of an independent throwing device. The orientation of the throwing device makes it possible for the thermoplastic yarns to be optimally thrown into the sheet of glass filaments, thereby resulting in excellent intermingling of the filaments.

The means for throwing the thermoplastic filaments may consist in particular of a venturi system. This device has the advantage of intermingling the glass filaments and thermoplastic filaments, these arriving at identical speeds. It is thus possible to form intermingled filaments which are linear.

In a variant, it is possible to obtain composite yarns whose glass filaments are linear and whose thermoplastic filaments are undulated. This type of yarn, bulked to a greater or lesser extent, is desirable in certain textile applications. To do this, all that is required is to give the thermoplastic filaments a speed greater than that of the glass filaments. The greater speed of the thermoplastic filaments is set at the drawing device by means of the speed of rotation of the drum rolls.

The devices described above allow the use of bushings having a large number of orifices for the continuous production, directly and for a lower cost, of a composite yarn composed of glass filaments and thermoplastic filaments distributed homogeneously within this yarn.

Such devices also have the advantage of producing, with a high productivity, wound packages of composite yarns having a high linear density (of about 3000 tex or g/km) or several simultaneous wound packages of composite yarns, continuously and directly from the materials constituting the filaments.

Further details and advantageous features of the invention will become apparent on reading the examples of devices illustrated by the following figures.

Figure 1:
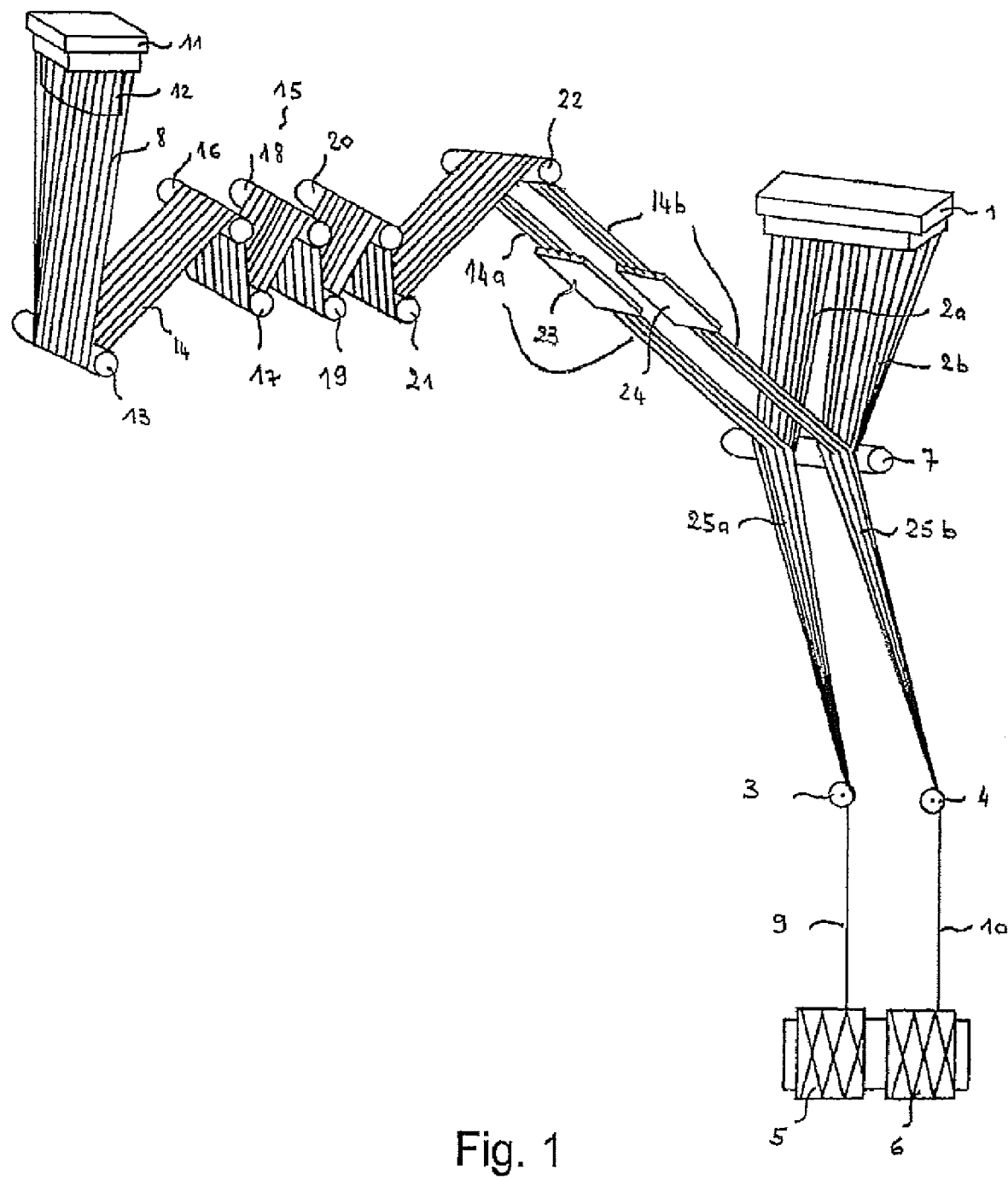
FIG. 1 is a schematic view of the entire installation according to a first embodiment of the invention.

The invention illustrated in FIG. 1 comprises a bushing 1 fed with molten glass either from the fore-hearth of a furnace which conveys the glass directly to its top, or via a hopper containing cold glass, for example in the form of beads which simply drop under gravity.

Whatever the feed, the bushing 1 is usually made of a platinum-rhodium alloy and is heated by resistance heating so as to melt the glass or to maintain it at a high temperature. From the bushing 1 a multitude of streams of molten glass flow, and these are drawn in the form of two bundles 2a, 2b of filaments by a device (not shown), which also allows the packages 5 and 6 to be formed. The bundles 2a, 2b are kept separated by means of two grooved pulleys 3 and 4. Placed in the path of the bundles 2a, 2b is a coating roll 7, for example made of graphite, which deposits a sizing on the glass filaments, said sizing being intended to prevent or limit the rubbing of the filaments on members with which they come into contact. The sizing may be aqueous or anhydrous (that is containing less than 5% water) and comprise compounds, or derivatives of these compounds, which form part of the composition of the thermoplastic filaments 8 which are combined with the glass filaments to form the composite yarns 9 and 10.

FIG. 1 also shows schematically a spinning head 11 from which the thermoplastic filaments 8 are extruded. The spinning head 11 is fed with a molten thermoplastic, for example coming from an extruder (not shown) fed with granules, which thermoplastic flows out, under pressure, through multiple orifices placed beneath the spinning head 11, in order to form the filaments 8 by drawing and cooling. The filaments are cooled by forced convection by means of a conditioning device 12, of shape tailored to the spinning head 11, which generates a laminar flow of air perpendicular to the filaments. The cooling air has a flow rate, a temperature and a moisture content which are kept constant. The filaments 8 then pass over a roll 13 which makes it possible, on the one hand, to gather them in the form of a sheet 14 and, on the other hand, to deflect their path. After passing over the roll 13, the sheet 14 of thermoplastic filaments is directed towards the drum drawing device 15, which drawing device consists here of six drums 16, 17, 18, 19, 20, 21.

The drums 16, 17, 18, 19, 20, 21 have different speeds so that they create an acceleration in the direction of movement of the sheet 14. In the present case, these drums operate in pairs. Associated with the drums 16, 17 forming the first pair is a heater (not shown) which may, for example, be an electrical system making it possible, by contact, to increase the temperature of the thermoplastic yarns uniformly and rapidly. The rise in temperature depends on the nature of the thermoplastic used. The drums 16, 17 are driven at the same speed, which allows the thermoplastic filaments 8 to be drawn from the spinning head 11.

The second pair of drums 18, 19 is driven at a higher speed than that of the first pair. The sheet 14 of thermoplastic filaments heated by passing over the first pair of drums 16, 17 undergoes an acceleration due to the difference in speed of the two pairs of rolls, which acceleration results in an elongation of the filaments of the sheet 14 and a modification in their structure.

The last pair of drums 20, 21 is driven at the same speed or a speed greater than that of the previous pair and comprises a cooling device (not shown), for example of the water-jacket type, which makes it possible to fix the structure of the filaments of the sheet 14.

The heating and the cooling of the sheet 14 of thermoplastic filaments must both be carried out rapidly and uniformly.

The drawing device 15 may comprise a larger number of drums, provided that they comply with the three aforementioned zones, namely heating, drawing and cooling. Moreover, each of these zones may consist of only a single drum. The drawing device may also consist of a succession of groups consisting of the three zones which have just been mentioned.

To contribute to the heating or cooling steps, it is also possible to insert stationary heating or cooling devices between the rolls of the drawing device 15 over which the sheet 14 of thermoplastic filaments slides.

The sheet 14 of thermoplastic filaments then passes over a deflecting roll 22, from which it is divided into two sheets 14a, 14b which then pass through two independent venturi systems 23, 24. The systems 23, 24 make it possible, on the one hand, to keep the thermoplastic filaments individualized and, on the other hand, to throw them into the glass filaments coming from the bundles 2a, 2b. The devices 23, 24 impart no additional speed to the sheets 14a, 14b by a supply of compressed air, thereby limiting the risk of said glass filaments being disturbed.

The sheets 14a, 14b of thermoplastic filaments and the glass filaments coming from the bundles 2a, 2b are joined together along the generatrix of the coating roll 7.

The sheets 25a, 25b of intermingled glass and thermoplastic filaments then passes over the pulleys 3, 4 which allow the glass and thermoplastic filaments to be assembled into two composite yarns 9, 10 which are immediately wound up in the form of two packages 5, 6 by means of the drawing device (not shown), which operates at a given linear speed kept constant in order to guarantee the desired mass per unit length.

This linear speed which allows the glass filaments to be drawn is in this case identical to that which the drums 20, 21 impart to the sheet 14 of thermoplastic filaments. In this way, the thermoplastic filaments have the same speed during blending and the composite yarn has no undulation during its formation.

Figure 2:
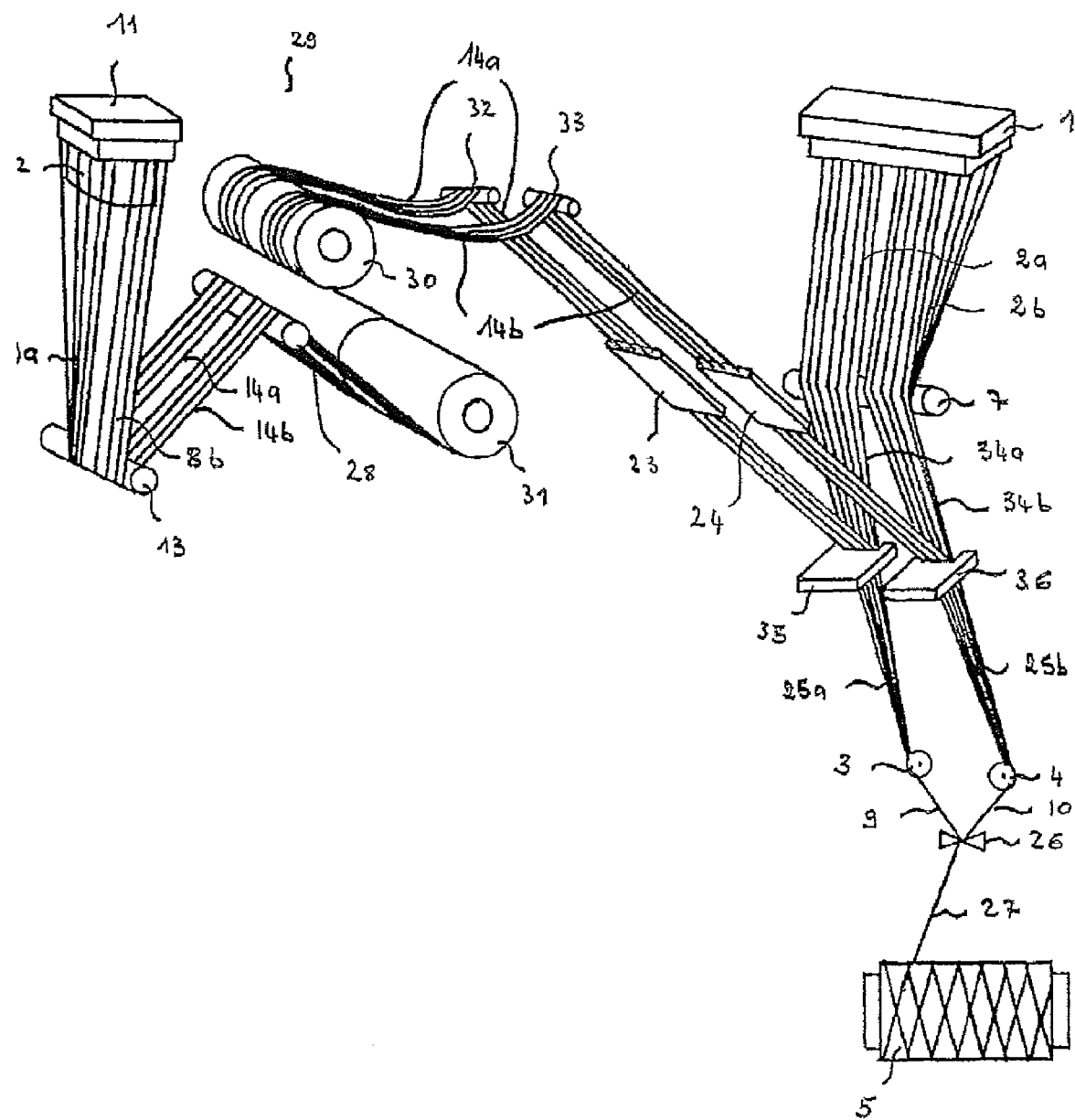
FIG. 2 is a schematic view of the entire installation according to a second embodiment of the invention.

In FIG. 2 illustrating the second embodiment of the invention, the elements identical to those in FIG. 1 bear the same reference numbers.

Streams of molten glass flowing out through a bushing 1 are drawn into two bundles 2a, 2b of glass filaments by means of a device (not shown) which also allows the package 5 to be formed.

The bundles 2a, 2b pass over a coating roll 7 and then over two pulleys 3, 4 for separating the bundles and for assembling the filaments, in order to form two composite yarns 9, 10 which are then joined together by an assembling element 26 in order to constitute the composite yarn 27 which is wound in the form of the package 5.

Simultaneously, the thermoplastic filaments are extruded in the form of two bundles 8a, 8b by means of the spinning head 11, comprising two separate series of orifices, which is filled with molten thermoplastic. The bundles 8a, 8b are cooled by the conditioning device 12 and then joined together on the roll 13 as two sheets 14a, 14b which are directed towards a second deflection roll 28 and then onto a drawing device 29 formed in this case by a pair of drums 30, 31.

The drums 30, 31 have the same rotation speed but they may also operate with different speeds. In the present case, the speed of the drum 31 is greater than the speed of the device serving to draw the glass filaments and form the package 5, thus allowing the thermoplastic filaments to relax.

The drawing device 29 may consist of a succession of pairs of heated or cooled drums, between which may be inserted heating or cooling devices.

The sheets 14a and 14b of relaxed thermoplastic filaments pass over two orientable rolls 32, 33 and then through venturi systems 23, 24 before being individually thrown into the sheets 34a, 34b of glass filaments.

The joining of the sheets 14a, 14b of thermoplastic filaments and the sheets 34a, 34b of glass filaments takes place between the coating roll 7 and the pulleys 3, 4. This arrangement is particularly advantageous as it allows the geometry of the sheets of glass filaments 34a, 34b to be correctly adapted and provides a homogeneous distribution of the two types of filaments. Deflectors 35, 36 provided with notches ensure the retention, in particular along the edges, of the filaments and make it possible to reduce the disturbance suffered by the sheets 34a, 34b of glass filaments during the throwing of the sheets 14a, 14b of thermoplastic filaments.

The sheets 25a, 25b of intermingled glass and thermoplastic filaments then pass over the pair of pulleys 3, 5 which is used to assemble the filaments and form two composite yarns 9, 10. These yarns are then joined together into a composite yarn 27 which is immediately wound into the form of the package 5 by the device (not shown) for drawing the glass filaments at the desired speed.

As indicated above, the drawing speed of the glass filaments is in this case lower than the speed of the drum 30, thereby allowing the thermoplastic filaments to relax before they pass over the rolls 32, 33. In this way, the subsequent retraction of the thermoplastic filaments does not cause the glass filaments to undulate and prevents the yarn fretting on the package 5.

According to either embodiment of the invention, it is also possible to manufacture a composite yarn having a high filling capacity, that is to say a yarn which comprises linear glass filaments and undulated thermoplastic filaments. This type of composite yarn proves to be advantageous in certain textile applications requiring a relatively thick fabric.

To produce such a composite yarn, it is preferable to modify the apparatus shown in FIGS. 1 and 2 by increasing the speed imparted to the sheet of thermoplastic filaments by means of the drawing device 15, 29, more precisely by the drums 18, 19, 31. By modifying the speed at which the thermoplastic filaments are thrown into the glass filaments, it is possible to adjust the amplitude of the undulations of the thermoplastic filaments, and therefore to manufacture a "bulked" or "texturized" composite yarn, that is to say one having a relatively high volume.

In FIGS. 1 and 2, the sheets 14a, 14b of thermoplastic filaments are thrown into the glass filaments along the generatrix of the coating roll 7 and after they have passed over said roll, respectively. However, it is possible to throw the thermoplastic filaments into the bundles 2a, 2b formed by the glass filaments, that is to say before the latter have passed over the coating roll 7. However, this method of intermingling is more difficult to implement since the thermoplastic filaments are thrown into the glass filaments without being coated with any sizing. It is therefore necessary for the throwing conditions to be precisely controlled so as to prevent the glass filaments, which at this stage are particularly fragile, from being broken.

The packages obtained using the process according to the invention consist of a composite yarn which has an excellent intermingling index. Within the context of the present invention, the expression "excellent intermingling index" should be understood to mean an intermingling index whose average value is less than 12. The average value of the intermingling index is measured in the following manner:

a certain number of cross sections of the composite yarn are taken over a given length;

a meshing of each of the cross sections is made;

on each mesh thus defined, the distribution per unit area between the glass filaments and the thermoplastic filaments is measured by a micrographic method of the image analysis type;

for each cross section, the standard deviation of the distributions per unit area of all the meshes is calculated, which is the intermingling index of the cross section in question; and the average intermingling index value is calculated for all the cross sections. As a general rule, the packages obtained within the context of the invention consist of a composite yarn whose glass filaments are not undulated, the thermoplastic filaments themselves possibly having undulations. In this way, it is easily possible to extract the yarn either by unwinding it, or by paying it out via the inside after having removed the sleeve serving as support for the package(s), which poses no problem.

Figure 3A:
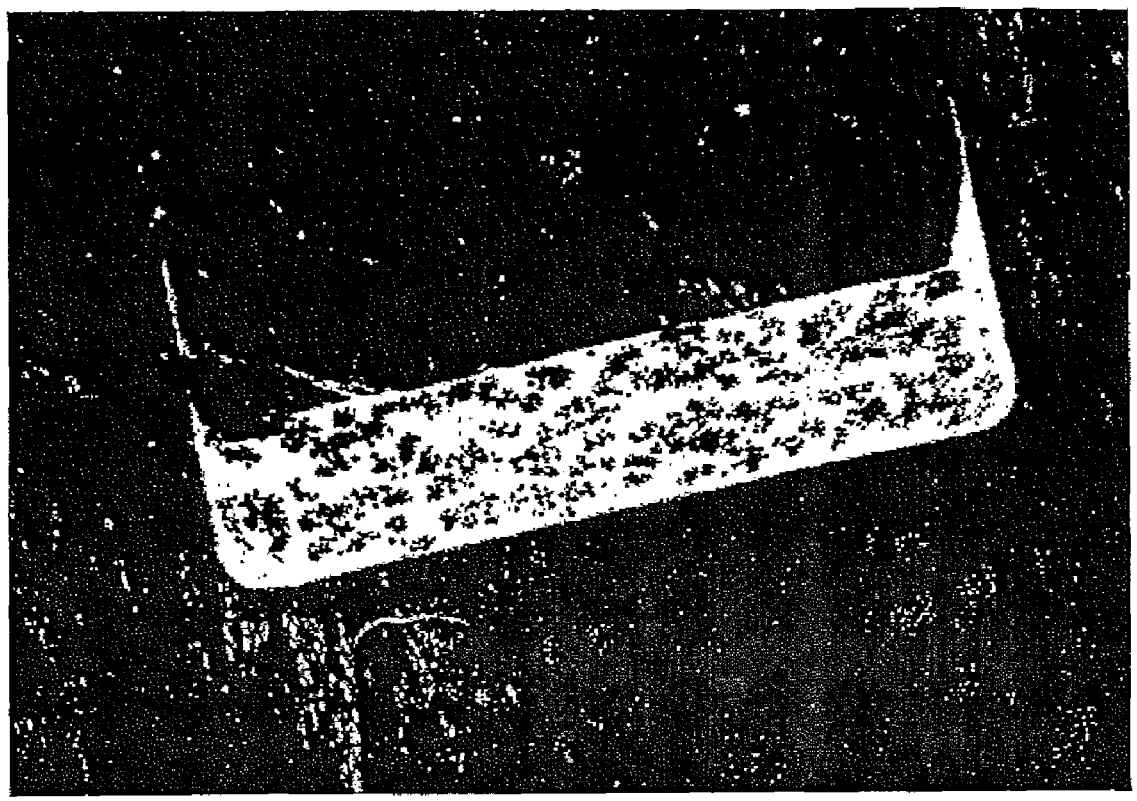
FIG. 3A is a cross section, seen using a binocular magnifier, of composite yarns obtained under the conditions according to the invention.
Figure 3B:
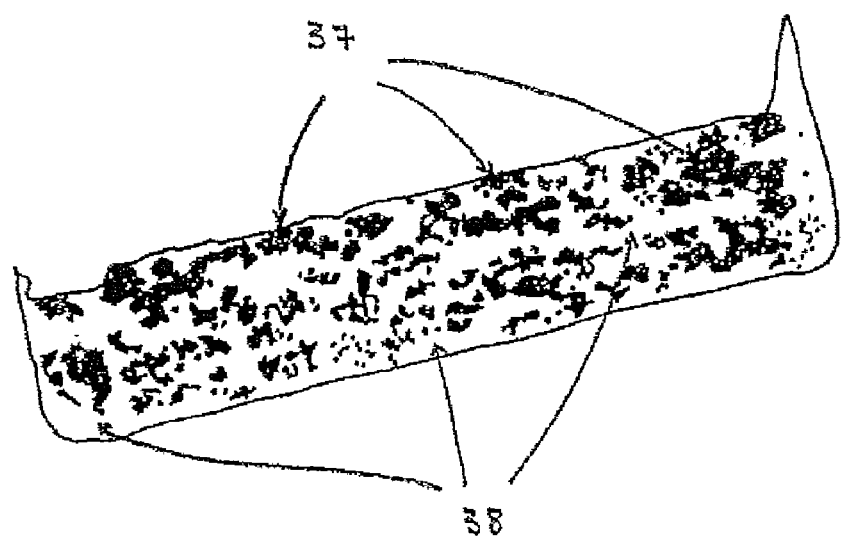
FIG. 3B is a schematic representation of this cross section.

FIG. 3A is a cross section, seen using a binocular magnifier, of a composite yarn according to the invention, consisting of 800 glass filaments 18.5 μm in diameter and 800 polypropylene filaments (linear density of the 60 wt % glass/40 wt % polypropylene hybrid yarn: 932 tex) obtained using the embodiment shown in FIG. 2. The composite yarn has an intermingling index of 9.86. In FIG. 3B, which is a schematic representation of the cross section of FIG. 3A, the glass filaments 37 (in black) and the polypropylene filaments 38 (in white) are approximately the same size and are distributed homogeneously within the yarn.

Figure 4A:
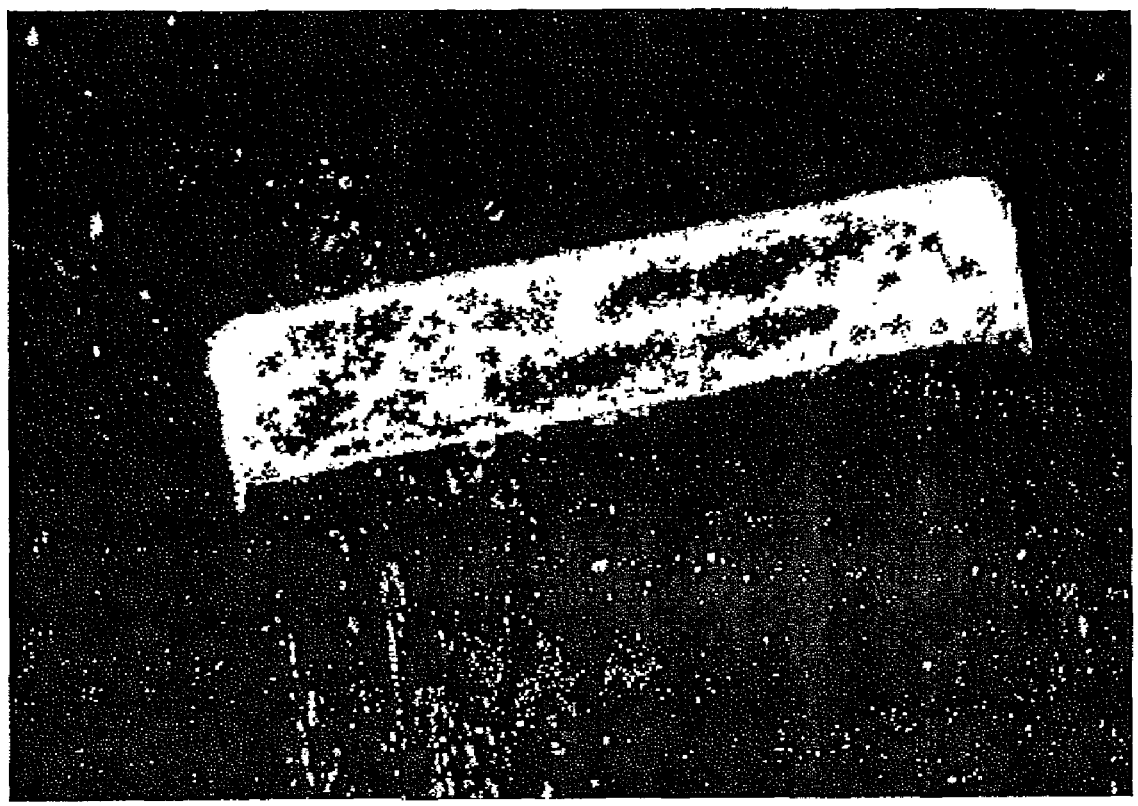
FIG. 4A is a cross section, seen using a binocular magnifier, of composite yarns obtained under conditions not according to the invention.
Figure 4B:
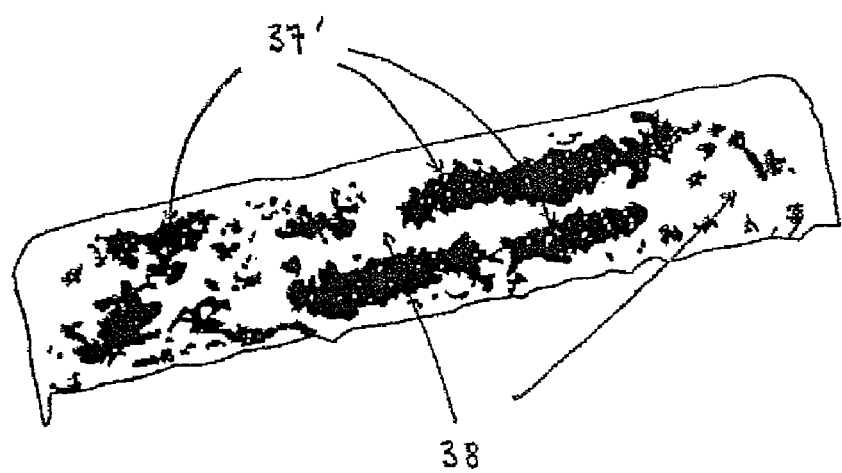
FIG. 4B is a representation of this cross section.

FIG. 4A is a cross section of a composite yarn not according to the invention, obtained by throwing a single sheet of 800 polypropylene filaments into a single sheet of 800 glass filaments. This yarn has an intermingling index of 15. In FIG. 4B, which corresponds to the schematic representation of the cross section of 4A, the glass filaments 37' and the polypropylene filaments 38' are less well mingled. In particular, the presence of considerable clumping of glass filaments 37' and of polypropylene filaments 38' should be noted, the latter being preferentially distributed around the periphery of the yarn.

It is possible to apply a few modifications to the devices according to the invention that have just been described. Firstly, it is possible to use a sizing consisting of several solutions (which may or may not be aqueous, comprising compounds capable of copolymerizing in a relatively short time when they are brought into contact with one another. In this case, the coater comprises separate rolls, each of them depositing one of the sizing solutions on the glass filaments. It is also possible to provide a dryer for removing the water from the glass filaments, or at the very least to appreciably reduce the water content, before winding.

In the implementation of the process according to the invention, it is possible to use any type of known glass, for example AR, R, S or E glass, the latter being preferred.

Likewise, it is possible to use any organic material of thermoplastic nature, the preferred materials being polyethylene, polypropylene, polyethylene terephthalate, polybutylene terephthalate, nylon-6, nylon-6,6 and nylon-12.

It is also possible to associate the invention with the production of complex composite yarns, that is to say composite yarns comprising various organic thermoplastics. To do this, it is possible to form filaments of different kinds, for example from one or more spinning heads, and to throw them, in individualized form or after having assembled them, into the glass filaments.

The invention claimed is:

1. An apparatus for manufacture of a composite yarn formed by intermingling of continuous glass filaments with continuous organic thermoplastic filaments, comprising:

at least one bushing fed with molten glass, a lower face of the at least one bushing being provided with a multiplicity of orifices associated with a coater;

at least one spinning head fed with a molten organic thermoplastic, a lower face of the at least one spinning head being provided with a multiplicity of orifices, associated with a variable-speed drawing device wherein the spinning head extrudes a plurality of bundles of thermoplastic filaments;

a roll around which the plurality of bundles travel, wherein the roll joins the plurality of bundles into a plurality of sheets of thermoplastic filaments; and means common to the bushing and to the spinning head, allowing the composite yarn to be assembled and drawn, wherein the bushing is associated with means for separating the glass filaments into a plurality of bundles or sheets, and the spinning head is associated with means for mingling the sheets of thermoplastic filaments with the bundles or sheets of continuous glass filaments.

2. The apparatus as claimed in claim 1, wherein the means for mingling the thermoplastic filaments with the glass filaments includes venturi devices.

3. The apparatus as claimed in claim 2, wherein each venturi device is associated with a deflector placed in front of the glass filaments.

4. The apparatus as claimed in claim 1, wherein the means allowing the glass filaments to be separated is placed between the coater and the device for mechanically pulling off the composite yarn.

5. The apparatus as claimed in claim 1, wherein the means for separating the continuous glass filaments comprise spreading combs.

6. The apparatus as claimed in claim 1, wherein the means for separating the continuous glass filaments comprise grooved pulleys.

7. The apparatus as claimed in claim 1, wherein the variable-speed drawing device comprises drums that operate at different speeds.

8. The apparatus as claimed in claim 1, wherein the spinning head is capable of producing at least two bundles of continuous organic thermoplastic filaments.

9. The apparatus as claimed in claim 8, wherein the variable speed drawing device comprises a drum capable of operating at a speed greater than a drawing speed of the glass filaments, thereby allowing the thermoplastic filaments to relax.

10. The apparatus as claimed in claim 1, wherein the means for separating the glass filaments are placed such that each sheet delimited by the coater and said means for separating the glass filaments has the shape of an isosceles triangle into which the thermoplastic filaments are thrown.

\* \* \* \* \*